US011969948B2

(12) United States Patent
MacNeish et al.

(10) Patent No.: US 11,969,948 B2
(45) Date of Patent: Apr. 30, 2024

(54) APPARATUS, SYSTEM AND METHOD OF PROCESS MONITORING AND CONTROL IN AN ADDITIVE MANUFACTURING ENVIRONMENT

(71) Applicant: JABIL INC., St. Petersburg, FL (US)

(72) Inventors: William MacNeish, St. Petersburg, FL (US); Erik Gjovik, St. Petersburg, FL (US)

(73) Assignee: JABIL INC.

( * ) Notice: Subject to any disclaimer, the term of this patent is extended or adjusted under 35 U.S.C. 154(b) by 235 days.

(21) Appl. No.: 17/393,512

(22) Filed: Aug. 4, 2021

(65) Prior Publication Data
US 2021/0362434 A1 Nov. 25, 2021

Related U.S. Application Data

(63) Continuation of application No. 15/723,874, filed on Oct. 3, 2017, now Pat. No. 11,485,088.

(51) Int. Cl.
*B29C 64/118* (2017.01)
*B29C 64/393* (2017.01)
(Continued)

(52) U.S. Cl.
CPC .......... *B29C 64/393* (2017.08); *B29C 64/118* (2017.08); *B33Y 10/00* (2014.12); *B33Y 30/00* (2014.12); *B33Y 50/02* (2014.12)

(58) Field of Classification Search
CPC ..... B29C 64/393; B29C 64/118; B33Y 30/00; B33Y 10/00; B33Y 50/02
See application file for complete search history.

(56) References Cited

U.S. PATENT DOCUMENTS 6,054,077 A  4/2000  Comb et al.
6,547,995 B1  4/2003  Comb et al.
(Continued)

FOREIGN PATENT DOCUMENTS

CN  103978684  8/2014
CN  104669623 B  6/2015
(Continued)

OTHER PUBLICATIONS

International Search Report and Written Opinion, dated Oct. 3, 2018 for PCT/US2018/054241.
(Continued)

*Primary Examiner* — Monica A Huson
*Assistant Examiner* — Kelsey C Grace
(74) *Attorney, Agent, or Firm* — Riverside Law LLP

(57) ABSTRACT

Apparatuses, systems and methods capable of controlling an additive manufacturing print process on an additive manufacturing printer. The disclosed embodiments may include: a plurality of sensors capable of monitoring at least one of an input of print filament to a print head of the printer, and a temperature of a nozzle of the printer, as indicative of a state of the additive manufacturing print process; at least one processor associated with at least one controller and capable of receiving sensor data regarding the monitoring from the plurality of sensors, and comprising non-transitory computing code for applying to the sensor data at least one correct one of the state of the additive manufacturing print process; a comparator embedded in the non-transitory computing code for assessing a lack of compliance of the print process to the correct one of the state; and at least one modifying output of the at least one controller to revise the compliance of the print process to the correct one of the state.

5 Claims, 13 Drawing Sheets

(51) Int. Cl.
  B33Y 10/00  (2015.01)
  B33Y 30/00  (2015.01)
  B33Y 50/02  (2015.01)

(56) References Cited

U.S. PATENT DOCUMENTS

| | | | |
|---|---|---|---|
| 6,685,866 | B2 | 2/2004 | Swanson et al. |
| 6,814,907 | B1 | 11/2004 | Comb et al. |
| 7,896,209 | B2 | 3/2011 | Batchelder et al. |
| 9,327,447 | B2 | 5/2016 | Batchelder et al. |
| 10,073,424 | B2 | 9/2018 | Lin et al. |
| 10,086,564 | B2 | 10/2018 | Batchelder et al. |
| 10,131,131 | B2 | 11/2018 | Batchelder et al. |
| 10,137,679 | B2 | 11/2018 | Brennan |
| 10,201,931 | B2 | 2/2019 | Batchelder et al. |
| 10,286,606 | B2 | 5/2019 | Duro Royo et al. |
| 10,421,267 | B2 | 9/2019 | Reese |
| 2004/0104515 | A1 | 6/2004 | Swanson et al. |
| 2005/0129941 | A1 | 6/2005 | Comb et al. |
| 2012/0018924 | A1 | 1/2012 | Swanson et al. |
| 2012/0070523 | A1 | 3/2012 | Swanson et al. |
| 2012/0258190 | A1 | 10/2012 | Batchelder et al. |
| 2015/0086668 | A1 | 3/2015 | Perez et al. |
| 2015/0097308 | A1 | 4/2015 | Batchelder et al. |
| 2015/0165691 | A1* | 6/2015 | Mark .................. B29C 64/393 700/98 |
| 2015/0321418 | A1 | 11/2015 | Nike et al. |
| 2016/0046081 | A1 | 2/2016 | Kim |
| 2016/0214175 | A1 | 7/2016 | Nordstrom |
| 2016/0283833 | A1 | 9/2016 | Peek |
| 2016/0332377 | A1 | 11/2016 | Lee et al. |
| 2017/0100888 | A1 | 4/2017 | Batchelder |
| 2017/0151704 | A1 | 6/2017 | Go et al. |
| 2017/0252819 | A1 | 9/2017 | Gibson |
| 2017/0274454 | A1 | 9/2017 | Feng |
| 2018/0056608 | A1 | 3/2018 | Dunn et al. |
| 2018/0207869 | A1 | 7/2018 | Lee et al. |
| 2018/0297290 | A1 | 10/2018 | Eyal |
| 2019/0001574 | A1 | 1/2019 | Yackabonis et al. |
| 2019/0217546 | A1 | 7/2019 | Bosveld et al. |
| 2019/0232566 | A1 | 8/2019 | Bosveld |
| 2019/0240969 | A1 | 8/2019 | Schuller et al. |

FOREIGN PATENT DOCUMENTS

| | | |
|---|---|---|
| CN | 105235222 A | 1/2016 |
| CN | 105666877 B | 6/2016 |
| CN | 205439280 U | 8/2016 |
| CN | 205661044 | 10/2016 |
| CN | 106671409 A | 5/2017 |
| CN | 206415609 | 8/2017 |
| CN | 206446128 U | 8/2017 |
| CN | 107415226 A | 12/2017 |
| CN | 107471626 A | 12/2017 |
| CN | 108311698 A | 7/2018 |
| CN | 207579114 U | 7/2018 |
| CN | 110039765 B | 4/2019 |
| EP | 2483060 | 4/2011 |
| EP | 20160099125 A | 8/2016 |
| EP | 3052299 B1 | 1/2018 |
| EP | 3281771 | 2/2018 |
| EP | 3342582 A1 | 7/2018 |
| KR | 100771169 B1 | 10/2007 |
| KR | 101524362 B1 | 6/2015 |
| KR | 20160021540 | 2/2016 |
| KR | 20160118606 | 10/2016 |
| KR | 1020170011951 A | 2/2017 |
| KR | 20170062965 A | 6/2017 |
| TW | 201634239 | 10/2016 |
| WO | 2007147221 | 12/2007 |
| WO | 201550958 A3 | 4/2015 |
| WO | 2015189661 A1 | 12/2015 |
| WO | 2016038356 | 3/2016 |
| WO | 2018038751 A1 | 3/2018 |
| WO | 2018170213 A1 | 9/2018 |
| WO | 2019005040 A1 | 1/2019 |
| WO | 2019141892 A1 | 7/2019 |
| WO | 20190183240 A1 | 9/2019 |

OTHER PUBLICATIONS

Signmund Arntsonn Tronvoll, Sebastian Popp, Christer Westum Elverum and Torgeir Welo, Investigating Pressure Advance Algorithms for Filament-Based Melt Extrusion Additive Manufacturing: Theory, Practice and Simulations; vol. 25—No. 5—2019—830-839; Rapid Prototyping Journal 25/5 (2019) 830-839 Emerald Publishing Limited.

International Preliminary Report on Patentability, dated Apr. 8, 2020 for PCT/US2018/054241.

International Search Report, dated Apr. 19, 2019 for PCT/US2018/054241.

Office Action (Non-Final Rejection) dated Oct. 11, 2023 for U.S. Appl. No. 17/482,233 (pp. 1-9).

Written Opinion of the International Searching Authority, dated Apr. 11, 2019 for PCT/US2018/054241.

* cited by examiner

APPARATUS, SYSTEM AND METHOD OF PROCESS MONITORING AND CONTROL IN AN ADDITIVE MANUFACTURING ENVIRONMENT

CROSS-REFERENCE TO RELATED APPLICATIONS

The present application is a Continuation Application of U.S. patent application Ser. No. 15/723,874, filed Oct. 3, 2017, entitled: "Apparatus, System and Method of Process Monitoring and Control in an Additive Manufacturing Environment", the entirety of which is incorporated herein by reference as if set forth in its respective entirety.

BACKGROUND

Field of the Disclosure

The present disclosure relates to additive manufacturing, and, more specifically, to an apparatus, system and method of process monitoring and control in an additive manufacturing environment.

Description of the Background

Additive manufacturing, including three dimensional printing, has constituted a very significant advance in the development of not only printing technologies, but also of product research and development capabilities, prototyping capabilities, and experimental capabilities, by way of example. Of available additive manufacturing (collectively "3D printing") technologies, fused deposition of material ("FDM") printing is one of the most significant types of 3D printing that has been developed.

FDM is an additive manufacturing technology that allows for the creation of 3D elements on a layer-by-layer basis, starting with the base, or bottom, layer of a printed element and printing to the top, or last, layer via the use of, for example, heating and extruding thermoplastic filaments into the successive layers. Simplistically stated, an FDM system includes a print head from which the print material filament is fed to a heated nozzle, an X-Y planar control form moving the print head in the X-Y plane, and a print platform upon which the base is printed and which moves in the Z-axis as successive layers are printed.

More particularly, the FDM printer nozzle heats the thermoplastic print filament received from the print head to a semi-liquid state, and deposits the semi-liquid thermoplastic in variably sized beads along the X-Y planar extrusion path plan provided for the building of each successive layer of the element. The printed bead/trace size may vary based on the part, or aspect of the part, then-being printed. Further, if structural support for an aspect of a part is needed, the trace printed by the FDM printer may include removable material to act as a sort of scaffolding to support the aspect of the part for which support is needed. Accordingly, FDM may be used to build simple or complex geometries for experimental or functional parts, such as for use in prototyping, low volume production, manufacturing aids, and the like.

However, the use of FDM in broader applications, such as medium to high volume production, is severely limited due to a number of factors affecting FDM, and in particular affecting the printing speed, quality, and efficiency for the FDM process. As referenced, in FDM printing it is typical that a heated thermoplastic is squeezed outwardly from a heating nozzle onto either a print plate/platform or a previous layer of the part being produced. The nozzle is moved about by the robotic X-Y planar adjustment of the print head in accordance with a pre-entered geometry, such as may be entered into a processor to control the robotic movements to form the part desired.

In typical FDM print processes, the printing is "open loop", at least in that feedback is not provided so that printing may be correctively modified when flaws occur, or so that printing may be stopped when a fatal flaw occurs. For example, it is typical in known FDM printing that the print material may be under- or overheated, and thereby eventually cause clogging or globbing, or that the print material feed to and through the print head may go askew, causing the printer to jam or otherwise mis-feed. However, in the known art, upon such fatal print flaws, the printer will generally continue to print until, for example, a ball of print material is formed about the print nozzle, or a clogged nozzle overheats or suffers a fatal breakdown, or the print material unspools in an undesirable manner.

Many other significant or fatal print flaws may occur in the current art, such as wherein the print head or the nozzle heater fails to properly shut off. Because of the frequency of occurrence of the afore-discussed printing breakdowns, there are typically a great many settings needed to engage in an additive manufacturing print. For example, because bleeding and globbing are frequent, whereby nipples or bumps may be undesirably created on a print build, a myriad of settings are generally provided in order to provide for desired printer turn on, turn off, heat levels, and the like. Further, other settings unrelated to the nozzle or print head may be needed, such as refined temperature control for the build plate so that the build plate temperature does not become excessive and consequently deform the print build.

However, in the known art, the print performance resultant from such settings remains unmonitored. Accordingly, in the event a setting does not suitably anticipate a particular breakdown, a mis-setting occurs, or an unforeseen breakdown results even from a proper initial setting, the current art does not provide solutions that enable successful print runs in such cases.

Therefore, the need exists for an apparatus, system, and method for process monitoring and control in at least an FDM additive manufacturing environment.

SUMMARY

The disclosed exemplary apparatuses, systems and methods are capable of controlling an additive manufacturing print process on an additive manufacturing printer. The disclosed embodiments may include: a plurality of sensors capable of monitoring at least one of an input of print filament to a print head of the printer, and a temperature of a nozzle of the printer, as indicative of a state of the additive manufacturing print process; at least one processor associated with at least one controller and capable of receiving sensor data regarding the monitoring from the plurality of sensors, and comprising non-transitory computing code for applying to the sensor data at least one correct one of the state of the additive manufacturing print process; a comparator embedded in the non-transitory computing code for assessing a lack of compliance of the print process to the correct one of the state; and at least one modifying output of the at least one controller to revise the compliance of the print process to the correct one of the state.

Thus, the disclosed embodiments provide an apparatus, system, and method for process monitoring and control in an additive manufacturing environment.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
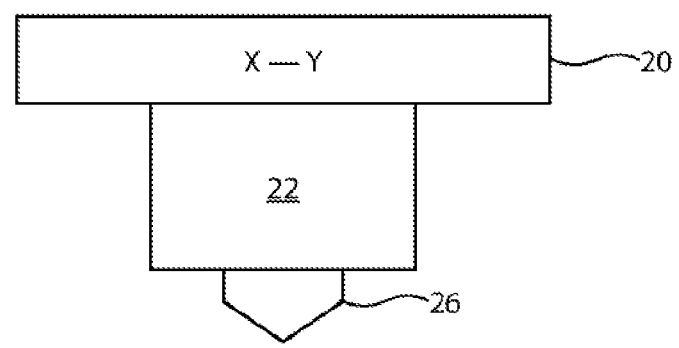
FIG. 1 is an illustration of an additive manufacturing printer.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

In order to address the print flaws discussed above without the need for a large number of selectable print settings, the embodiments provide at least print process monitoring and control, such as may include a variety of sensing. For example, sensing in the embodiments may include optical sensing, motor encoding, camera based sensing, time of flight sensing, and the like. One or more of the foregoing manner of sensing may monitor aspects of the print build process, such as the feed rate and profile at the print head input, at the print head output, the heat level or melt level at the nozzle and/or at aspects of the hot end, and the like. Further, combinations of multiple ones of the foregoing sensor systems may provide extraordinary levels of process monitoring heretofore unknown in the available art.

Thereby, while sensors monitor the print process, feedback gained from the sensor data may enable modification of the print process, such as to allow for corrective action. Such corrective action may include modifying a print process plan to account for and correct a minor flaw, or the cessation of a print in the event of a fatal flaw. As will be understood to the skilled artisan, the use of the sensor data, the feedback assessed thereby and resultant therefrom, and the print action resultant therefrom may be the result of the algorithms applied by a control system connectively associated with the printer and the sensors.

Thus, in the myriad embodiments provided herein, particularly to the extent such embodiments include one or more sensors sensing the printing process, the print process may be subjected to process control such that heretofore unknown process enhancements maybe enabled. For example, various process aspects, such as including power delivered to heat the print melt, heat delivered to the print melt, servo rotation of one or more of the print hobs of the print head, and the like may be readily controlled by association of these aforementioned devices and systems with one or more computer processors having resident thereon control software.

FIG. 1 is a block diagram illustrating an exemplary FDM printer 106. In the illustration, the printer includes an X-Y axis driver 20 suitable to move the print head 22, and thus the print nozzle 26, in a two dimensional plane, i.e., along the X and Y axes. Further included in the printer 106 for additive manufacturing are the aforementioned print head 22 and print nozzle 26. As is evident from FIG. 1, printing may occur upon the flow of heated print material outwardly from the nozzle 26 along a Z axis with respect to the X-Y planar movement of the X-Y driver 20 and onto the build plate 24. Thereby, layers of printed material 30 may be provided from the nozzle 26 along a path dictated by the X-Y driver 20 to form a print build 101.

Figure 2:
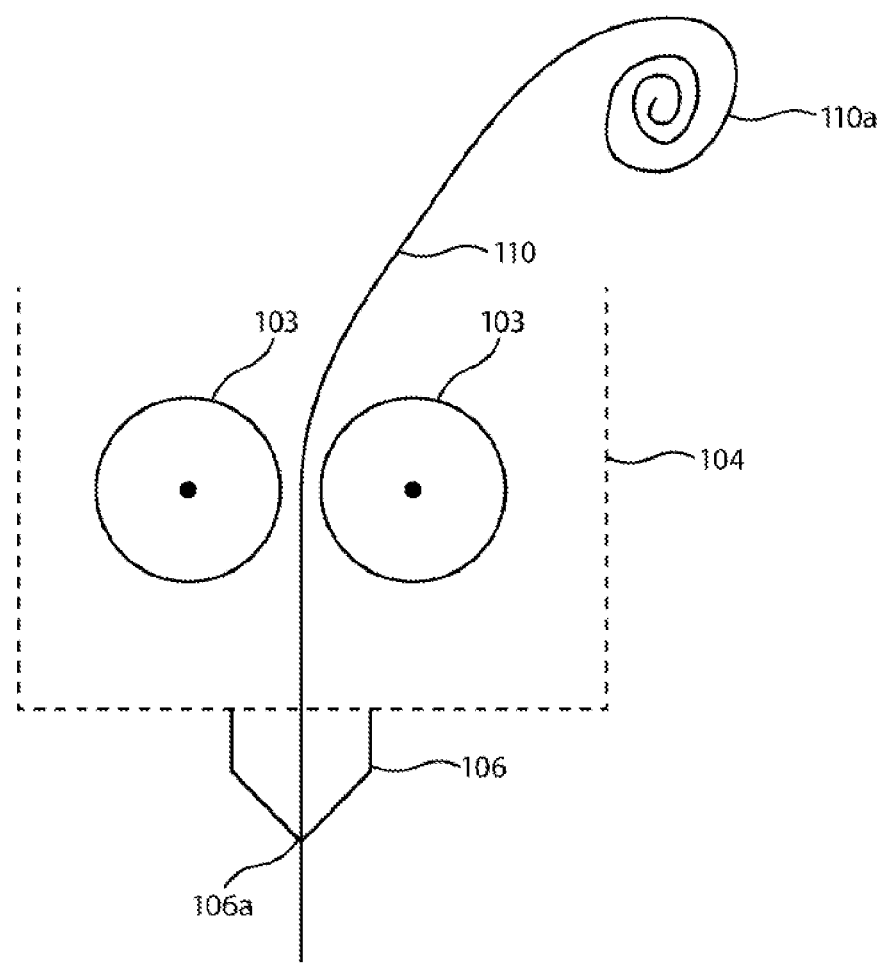
FIG. 2 is an illustration of an exemplary additive manufacturing system.

FIG. 2 illustrates with greater particularity a print head 104 and nozzle 106 system for an exemplary additive manufacturing device, such as a 3-D printer, such as a FDM printer. As illustrated, the print material 110 is extruded via hobs 103 of the head 104 from a spool of print material 110a into and through the heated nozzle 106. As the nozzle 106 heats the print material 110, the print material is at least partially liquefied for output from an end port 106a of the nozzle at a point along the nozzle distal from the print head 104. Thereby, the extruded material is "printed" outwardly from the port 106a via the Z axis along a X-Y planar path determined by the X-Y driver (see FIG. 1) connectively associated with the print head 104.

Figure 3:
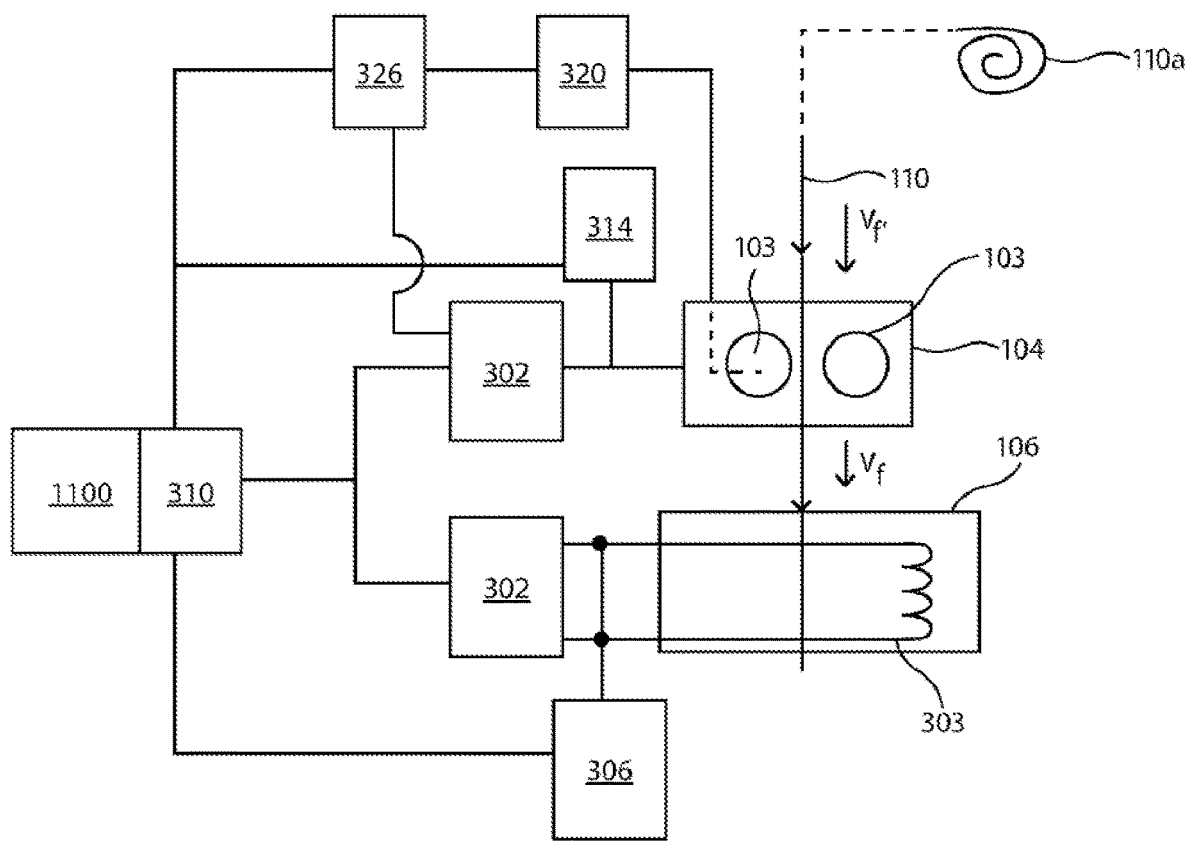
FIG. 3 illustrates an exemplary sensor and feedback-based additive manufacturing system.

As illustrated in FIG. 3, two principle elements of the additive manufacturing system, namely the heat delivered at the hot end 106 and the velocity, $V_f$, at which the print filament 110 is delivered to the hot end 106 by print head 104 may be subjected to a one or more sensors 302, such as a load assessment sensor 302, and to control by one or more controllers 310. More particularly, the hot end 106, as illustrated, may include one or more heating elements 303 that provide a sensed load 302 on the power delivery system 306 that causes the heating of the heating element 303. This power delivery system 306 may, in turn, be connected to one or more processor-driven controllers 310, such as a proportional integral derivative (PID) controller, which drive deliver of power to the heating element(s) 302. Alternatively, the skilled artisan will appreciate that various types of direct temperature sensors 302 may also be employed in the hot end, and may provide sensed data to control 310.

The filament 110 entering the hot end 106 to form the print melt may also have associated therewith a print head driver 314 that is associated with the print head 104 and which drives the filament 110 from the spool 110a and ultimately into the hot end 106. This print head drive 314, such as may include one or more servo-driven print hobs 103, may sense 302 a provided load on the one or more motors 320, such as servo or stepper motors, that drive either or both of the hobs 103. In turn, this motor 320 may be subjected to a motor driver 326, which motor drive 326 may also be communicatively associated with one or more motor drive sensors 302 and controller(s) 310, such as the aforementioned PID controller(s).

Those skilled in the art will appreciate that although any of various types of controllers 310 may be employed, certain of the embodiments may include a PID controller. A PID controller may be employed to calculate an error value that represents the difference between a desired set point and a measured process variable. Further, a PID controller may apply a correction value that is calculated as a function of the aforementioned difference. Thus, for example, a difference in temperate at the hot end 106 from a desired set point may represent a necessary adjustment by the PID controller of the thermocouple connectively associated with the heating element 303 of the hot end 106.

Of course, it will be understood that the embodiments are not limited to PID controllers, and thus that other types of controllers 310 and control systems may be employed in certain embodiments. By way of non-limiting example, individual controllers 310 may be communicative with, either locally or remotely via at least one network, either directly or indirectly, or either integral with or distinct from, one or more processing systems 1100. In such embodiments, the one or more processing systems 1100 may receive input from the one or more sensors 302 and may apply one or more control algorithms thereto in order to assess, for example, abnormal operation, inefficient operation, catastrophic operation, and may accordingly provide controls to make curative process adjustments.

Figure 4:
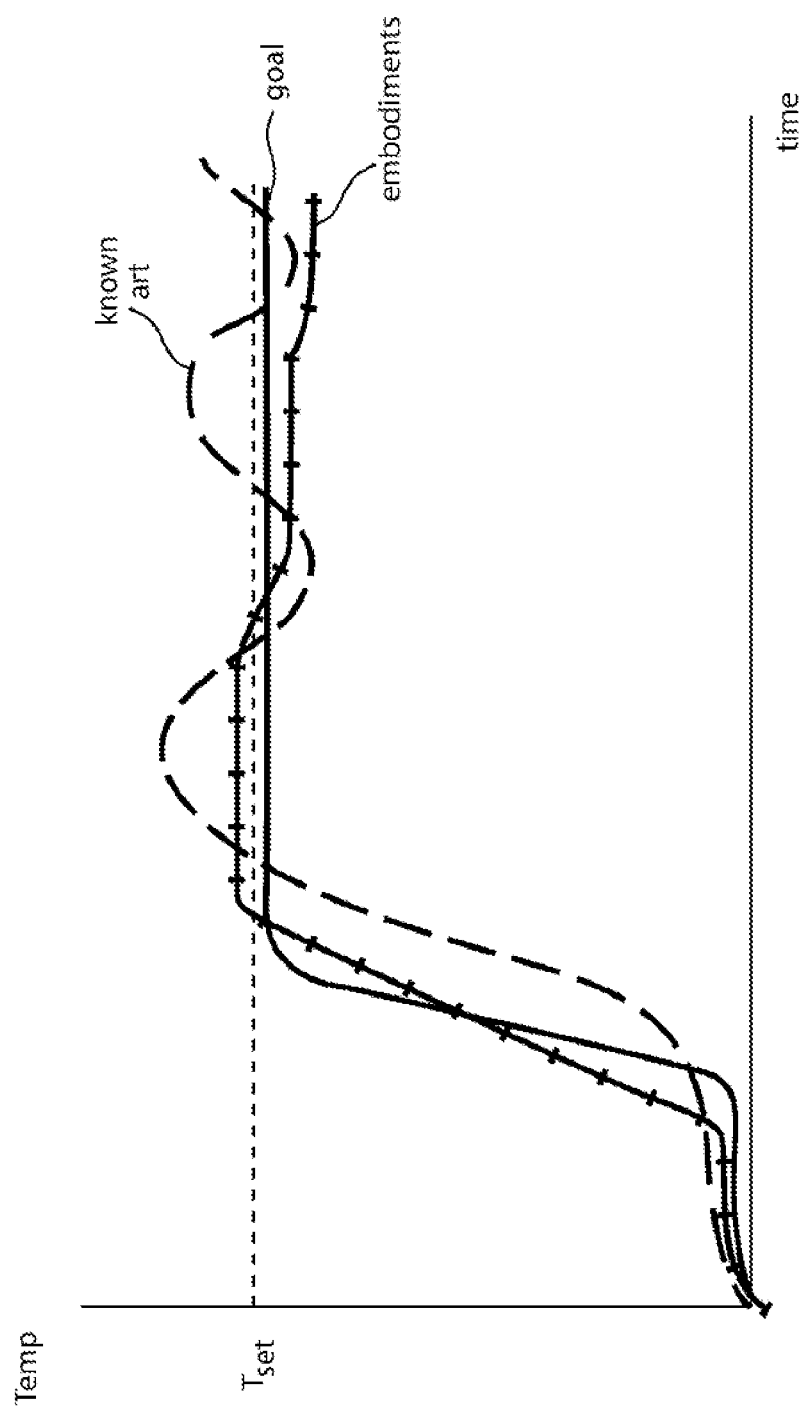
FIG. 4 illustrates an exemplary graph of achieving a set temperature in an additive manufacturing system.

In accordance with the foregoing, the controller 310 and/or the control system 310/1100 provided in the embodiments may provide not only lagging adjustments as may occur in the known art, but also algorithmically-generated leading, or anticipatory, adjustments. For example, leading adjustments to power levels may be based on prior print runs, calibration runs for a printer, or the like. This is illustrated with greater particularity in the graph of FIG. 4. As shown, a set temperature for the hot end may not be directly reflective of the power delivered to the hot end, as is known in the art. As such, efforts to reach a desired set temperature for the hot end may require continuous significant lagging adjustments in the known art based on, for example, temperature sensor readings. However, a more uniform temperature ramp to a desired set point, such as may be followed by a decreased necessity for power delivery to maintain the desired temperature set point, may be provided by the leading adjustments enabled by the control algorithms associated with controller 310 in the embodiments discussed throughout.

Figure 5:
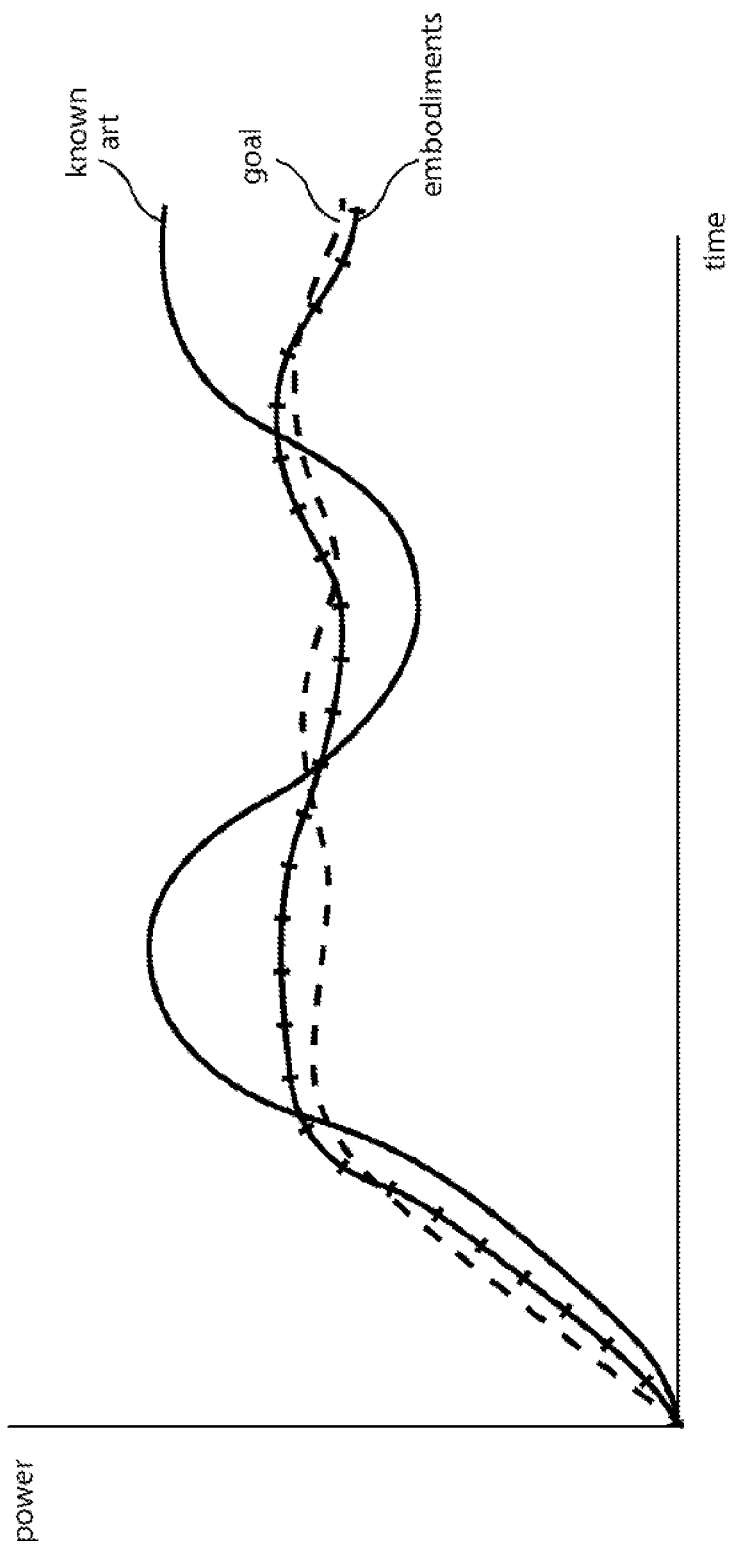
FIG. 5 illustrates an exemplary graph of power consumption in an additive manufacturing system.

The foregoing is likewise illustrated in the graph of FIG. 5, wherein it is shown that a leading adjustment better maintains a balance with the reality of temperature increases and decreases at the hot end, whereas the lagging adjustments provided in the known art suffer greater swings of necessary power delivery, and are hence more inefficient and less refined than the provided embodiments. As referenced, such leading adjustments may be assessed in one or more initial runs, such as may be used to formulate one or more control algorithms embedded in controller 310 unique to one or more print materials.

Figure 6:
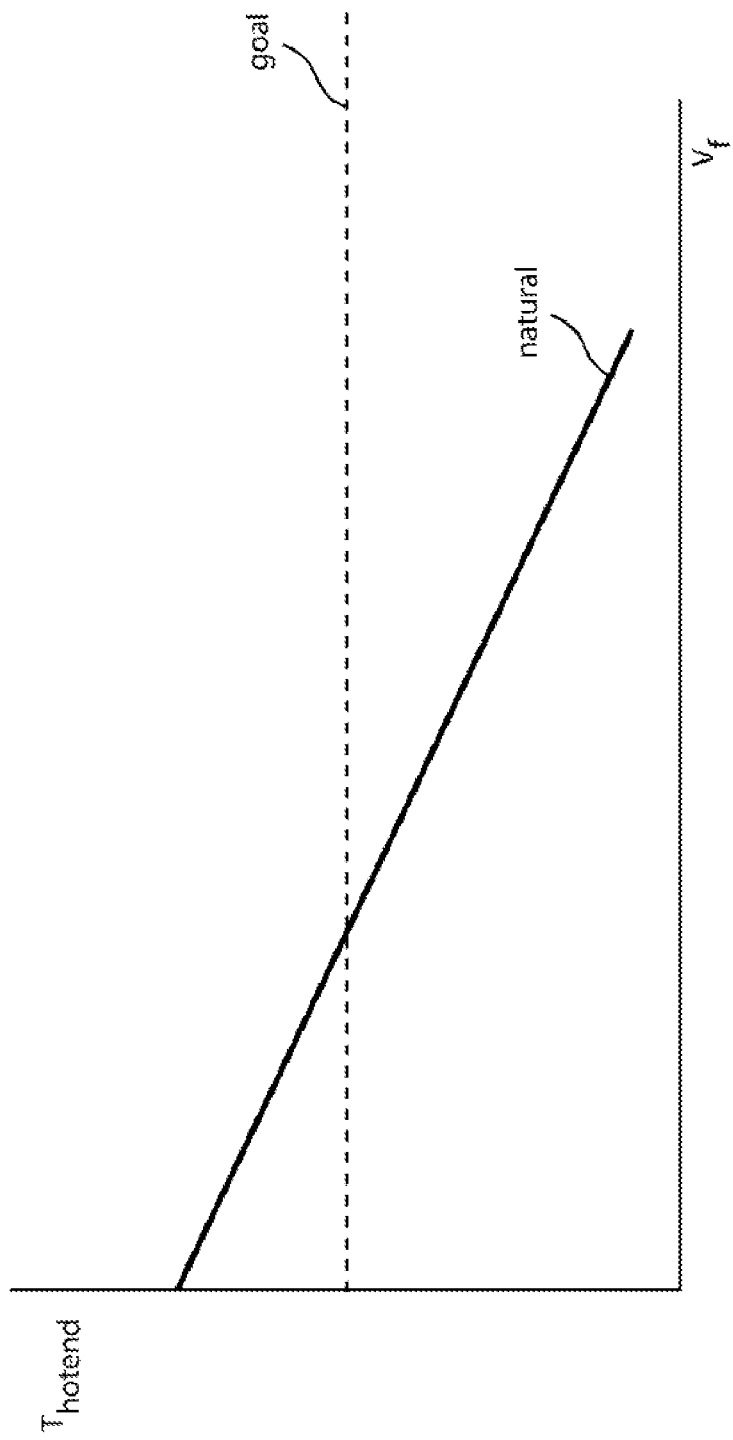
FIG. 6 illustrates an exemplary graph of temperature at the hot end versus filament velocity in an additive manufacturing system.

Moreover, the foregoing algorithmic adjustments may be suitable to address multivariable variations. For example, not only does the heat on a nozzle decrease as the power delivered to the heating element decreases, but further the temperature delivered to the hot end goes down as the filament material is pushed into the hot end at higher velocity. This is illustrated graphically in FIG. 6. Thereby, in such a circumstance, the controller discussed herein may adjust the temperature not only based on the heat loss rate of the hot end as power is decreased to the heating element, but may additionally adjust based on the rate of filament material being pushed into the hot end.

Environmental variations may constitute ones of the variables in the herein-discussed multivariable monitoring and control system. For example, power delivery algorithms may account for current or recorded environmental temperature, number of hours of print nozzle use, particular filament materials or spool providers, the physical makeup of the head end and/or the hot end, and the like. Thus, contrary to the known art, certain of the embodiments may provide close loop control for additive manufacturing systems, which may enable the aforementioned leading control adjustments. For example, sensors may be provided to assess the thickness or height of a trace as it is laid, as well as the temperature of the hot end as the trace is laid, and various characteristics of the print filament entering the head, entering the hobs, exiting the hobs, and/or entering the hot end, such as filament material, filament velocity, filament diameter, filament jitter, and the like. The control system 310/1100 may include an algorithm that takes into account all of these factors, and recognizes that the ambient temperature has risen 3 degrees C., which has caused a slight variation in $V_f$. Upon recognition of these process variables, the control algorithm may recognize that the hot end temperature should be lowered by 10 degrees C. to maintain desired trace characteristics, and this recognition may occur before the trace length undesirably varies.

Figure 7:
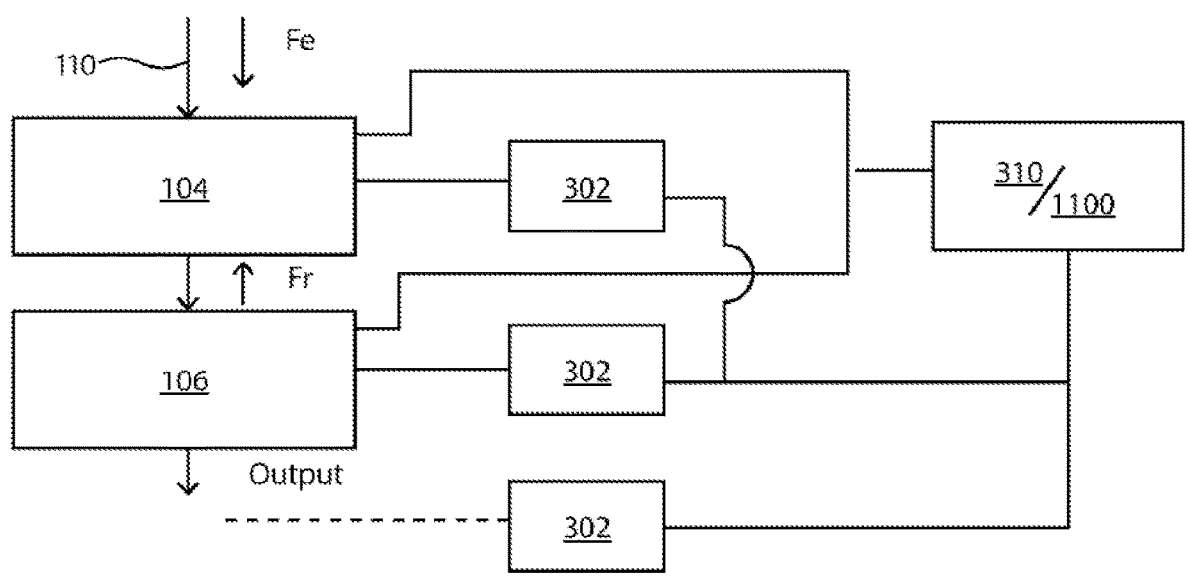
FIG. 7 illustrates an exemplary additive manufacturing system.

As more particularly illustrated in the block diagram of FIG. 7, in an embodiment, the foregoing aspects may be assessed, by way of non-limiting example, using two variables. These variables may be the force on the filament 110 towards the hot end 106, i.e., the extrusion force, $F_e$, and the reactive force on the filament 110 against the print head 104, $F_r$. As will be understood to the skilled artisan, the disclosed control system 310/1100 may include an algorithm whereby the laying of no trace is deemed indicative that $F_r$ is equal to or greater than $F_e$. Likewise, if the trace thickness is thinner than desired, $F_r$ is deemed too great in comparison to $F_e$, which may deemed to be caused by too little extrusion force, a lower hot end temperature than is desired, or the like. Further, an undesirably thick trace may indicate excessive $F_e$, unnecessarily high temperature, or the like. Not only may the disclosed sensors 302 allow for the foregoing assessments, but the control system 310/1100 discussed herein may allow for control adjustments of various printer aspects to account for these issues. For example, the controller 310 may indicate an increase or decrease in the print head hob speed, or may increase or decrease the delivery of power to the heating element 303 of the hot end 106.

Figure 8:
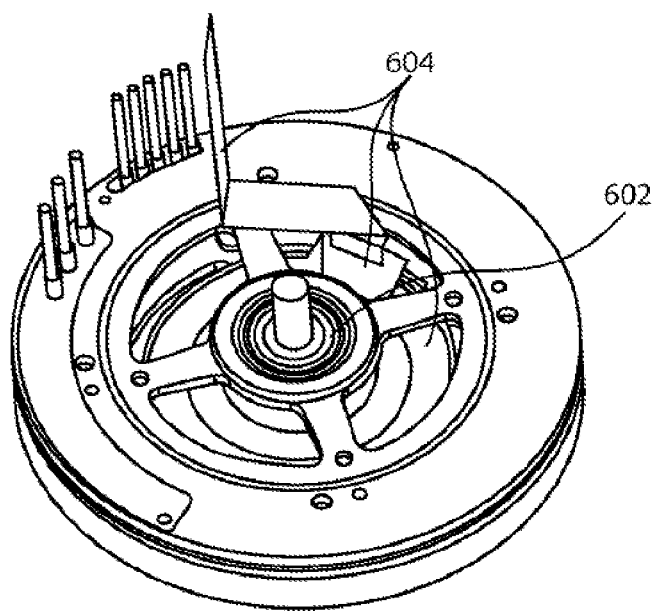
FIG. 8 illustrates an exemplary motor system for additive manufacturing.

Of course, sensing of the aforementioned variables may also allow for different assessments and control adjustments to be made, as will be understood to those skilled in the art. For example, sufficient $F_r$ that leads to the lack of a trace may be deemed by control system 310/1100 to be an indication of a clog. Further, sensors not explicitly discussed above, such as a hob-driving motor 602 having motor encoder 604 to indicate motor position as shown in FIG. 8, and thus velocity and/or motor torque, may also be used to assess relative forces which may indicate to a motor controller 310 that control adjustments are necessary.

Figure 9:
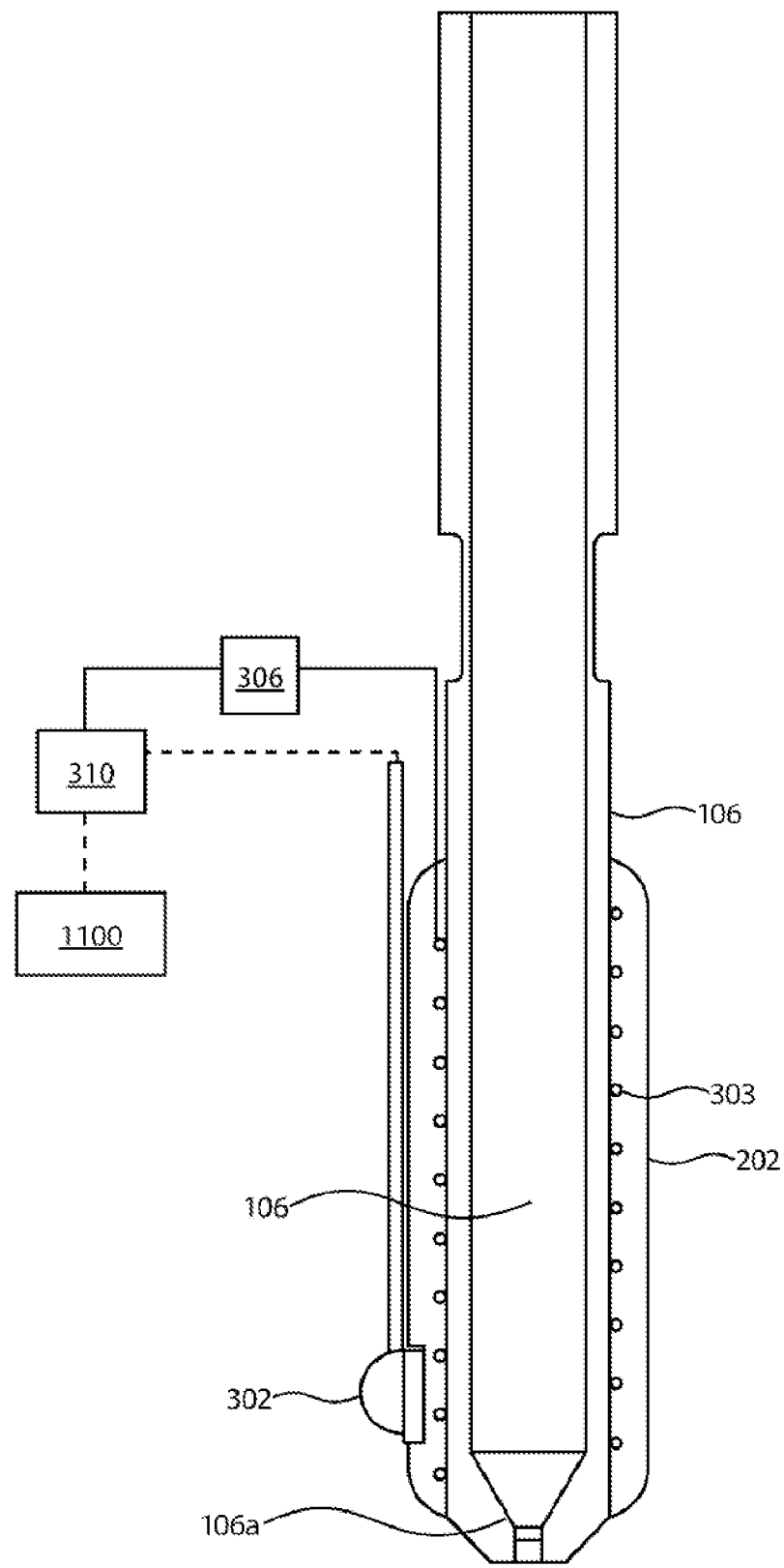
FIG. 9 illustrates an exemplary sensing and control embodiment for additive manufacturing.

FIG. 9 illustrates an exemplary sensing and control embodiment. The embodiment may include hot end 106, with nozzle port 106a, and the nozzle 106 may have associated therewith a heating element 303 under the control of power delivery system 306. The heating element 303 may be or include a resistive wire wrapping around nozzle 106. The heating element 303 may respond to power delivery system 306 under the control of controller 310 (which may include or be communicative with computing system 1100).

Controller 310 may modify control based on, by way of non-limiting example, sensing by nozzle-embedded sensor 302. Sensor 302 may be proximate to nozzle port 106a, and may thus read the temperature of the nozzle proximate to the output point of the print melt. Correspondingly, process control 310 may control the temperature proximate to nozzle port 106a based on feedback of the sensing of that temperature.

Of course, although the sensor 302 shown is on-board the nozzle 106, the sensor may be embedded in or on, or otherwise physically associated with, the nozzle 106. The sensor 302 may receive, directly or indirectly, the heat reading. The sensor 302 may additionally or alternatively comprise embedded traces or other inter- or intra-connective elements, as will be understood to the skilled artisan.

Figure 10:
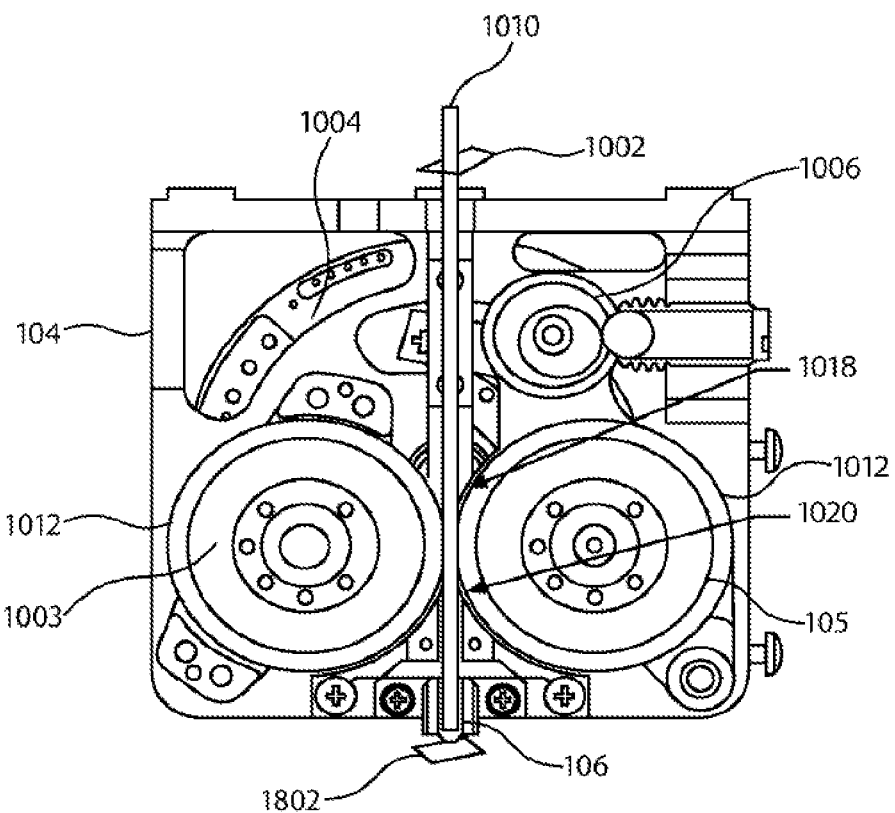
FIG. 10 illustrates an exemplary additive manufacturing print head and nozzle.

Yet further, for a variety of reasons, such as the typical unevenness of filaments 110 (i.e., filaments 110 are often uneven, such as thinner in some areas and thicker in others), additional sensors may be associated with a filament and/or the print output from nozzle port 106a. FIG. 10 illustrates a filament feed 1010 entering and passing through print head 104. A motor having encoding 1004 may be provided so that filament pull, grabbing, jamming, or crimping may be sensed to allow for ultimate adjustment of motor speed. The motor may drive hobs 1003, 1005. To the extent one hob 1005 is non-driven, it may be associated with one or more sensors 1006 that sense the force on filament 1010 by the non-driven hob.

The illustrated embodiment may include sensors 1012 that may sense the speed of rotation of hobs 1003, 1005. Additionally providing information to controller(s) 310 may be one or more of line scanners 1002 (to sense filament 1010 at entry point to head 104), 1018 (at entry point to the hobs 1003, 1005), 1020 (at exit point from hobs 1003, 1005), and 1802 (at exit from port 106a). These sensors may also or rather, by way of example, provide information on the force upon, temperature of, position of, velocity of, or other information on filament 1010, hobs 1003, 1003, motor 1004, or print output, by way of non-limiting example.

In short and as discussed throughout, the disclosed control system 310/1100 assures that machine time and materials are not wasted, at least in that if the desired result is not obtained, leading adjustments or system shutdown may be performed at a point earlier than in the known art. More particularly and as will be understood from FIG. 10, the motor 1004 that drives the print head hobs 1003, 1005 experiences and provides a relative torque that extrudes the filament 1010 into and through the hot end 104. As shown, one or more line scanners 1002, 1018, 1020, 1802, or other sensors, may be placed at, by way of non-limiting example, the nozzle port 106a, the print head entry point, or within the print head 104.

Accordingly, if the extrusion hobs 1003, 1005 are turned, the correct printing response should be obtained. If the motor torque and heat level indicate that the hobs should be extruding material, but no or the incorrect print output is seen, it is likely the case that the controller should assess that the hot end is clogged, or that there is another systematic issue that may require the raising or lowering of heat levels. For example, if no torque on the hob driver is assessed, either the hot end heat is much too high or the nozzle has been blown. Thereby, the disclosed embodiments may allow for both leading and lagging adjustments.

Similarly, hyperspectral scanning may be performed, by way of non-limiting example, at the hob entry point 1018. Such scanning may indicate to the control system the type of material loaded into the print head, may automatically load such material, and/or may set system parameters, such as heating levels, to enable a preset trace size. Further, hyperspectral and other types of scanning may allow for adequate feedback to allow for the leading adjustment discussed herein, such as whether the material entering the print head is as manually indicated, whether the color of the print materials is as desired, whether the build outcome is as desired, and the like. As such, in-process monitoring, as well as build volume monitoring, may be provided and overseen by the disclosed control systems.

More particularly, the controller feedback loop, such as the PID controller feedback loop, discussed throughout may assess element performance based on, for example, the voltage and or current drawn by the load of the element. Such a load may indicate, by way of non-limiting example, position, torque, velocity, heat, power, or the like. For example, a hob driver motor may indicate, based on the load that it provides, that it has a spend rate of 5 rpm. However, the specific characteristics may indicate that the motor rotation at 5 rpm requires 1 amp of current to maintain that rotation rate, whereas the control algorithm indicates that, if printing is occurring as expected, 0.1 amps of current should be drawn. Thereby, a system failure is indicated to the controller.

Figure 11:
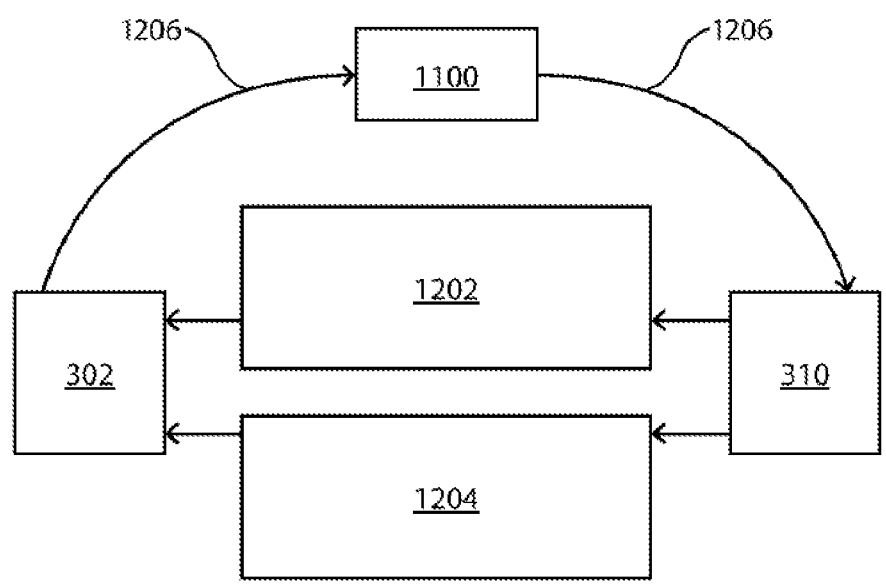
FIG. 11 is an illustration of an exemplary multi-axis additive manufacturing system.

By way of additional example and as illustrated in FIG. 11, if the print head, including the hob motor and motor controller, is taken as an "E Axis" 1202, and the hot end is taken as the "H Axis" 1204, the disclosed control systems 310 may make assessments from sensing feedback 1206, and leading or lagging adjustments, based on the characteristics of each axis. For example, if the H Axis 1204 must be at a temperature set of 200 degrees Celsius for a given E Axis 1202 rate, once a temperature sensor indicates that the temperature is at 200 degrees Celsius, the power supplied to the H Axis 1204 may be decreased in an effort to maintain the precise current temperature. However, if the E Axis 1202 is unable to maintain a material feed rate based on, for example, the electrical load indicated on the E Axis 1202, this may indicate that the temperature of the H Axis 1204 has fallen, that a clog in the nozzle has occurred, or that the filament material has unexpectedly changed.

Moreover, the disclosed control systems may include an algorithmic series of efforts to check for and remedy when a sensed problem occurs within the system. For example, a control system may engage in a checklist of the foregoing example. For example, if the H Axis 1204 indicates that it is at the proper temperature, an error in the foregoing example may be assessed as either a clog or a change in material. Consequently, the control system may increase the heat on the H Axis 1204, and may back up the filament on the E Axis, in an attempt to clear the clog. If neither of the foregoing efforts are successful to clear the error, the control system may automatically indicate that an unexpected material change has occurred.

As referenced throughout, the embodiments allow for leading adjustments. For example, if the H Axis 1204 indicates it is currently at the proper set temperature, but the build plan indicates to the E Axis 1202 that the extrusion rate is to increase, the H Axis 1204 may preemptively be instructed to increase the temperature in anticipation of the increase in extrusion rate. Of course, such leading adjustment may include various other factors, such as may include an assessment of the material being printed, or the best factors to be applied to the current print material in order to best obtain the desired build, by way of non-limiting example. Further for example, the control algorithm may make an assessment of the best temperatures and velocities for a particular build, and may adjust these variables in real time as the print occurs, such as in the event an unknown print material is placed into the printer.

Correspondingly, the feedback loop 1206 from the sensors 302 to the control system 310 and back to the controlled print elements in the disclosed embodiments may allow for adjustments to any of multiple process variables in real time. Moreover, this control feedback loop 1206 may enable adjustments to multiple variables, such as the balancing or weighting thereof, to obtain desired results in accordance with build plan in real time.

It should also be noted that the sensors 302 discussed throughout are non-limiting. For example, force feedback may be obtained based on motor performance, as discussed herein, may be assessed at the nozzle of the hot end, at the nozzle mount of the hot end, or the like. Further, one or more cameras, in place of or in addition to the line scanner(s) discussed herein, may be placed to allow for process monitoring. For example, cameras may be placed in association with the head end, the hot end, a spool feed, the print build, or the like. Such a head camera may include, by way of non-limiting example, a VIS camera, a thermal camera, a time of flight camera, or the like.

Further, the disclosed feedback systems may be hardware and/or software agnostic. That is, the controller(s) may be a deployable kernel; may be hosted in association with any system software; and/or may be for use with a generic hardware set. Of course, the skilled artisan will appreciate in light of the discussion herein that, in such hardware and software agnostic use cases, an operator may be needed to set initial parameters when a controlled system kernel is deployed.

Figure 12:
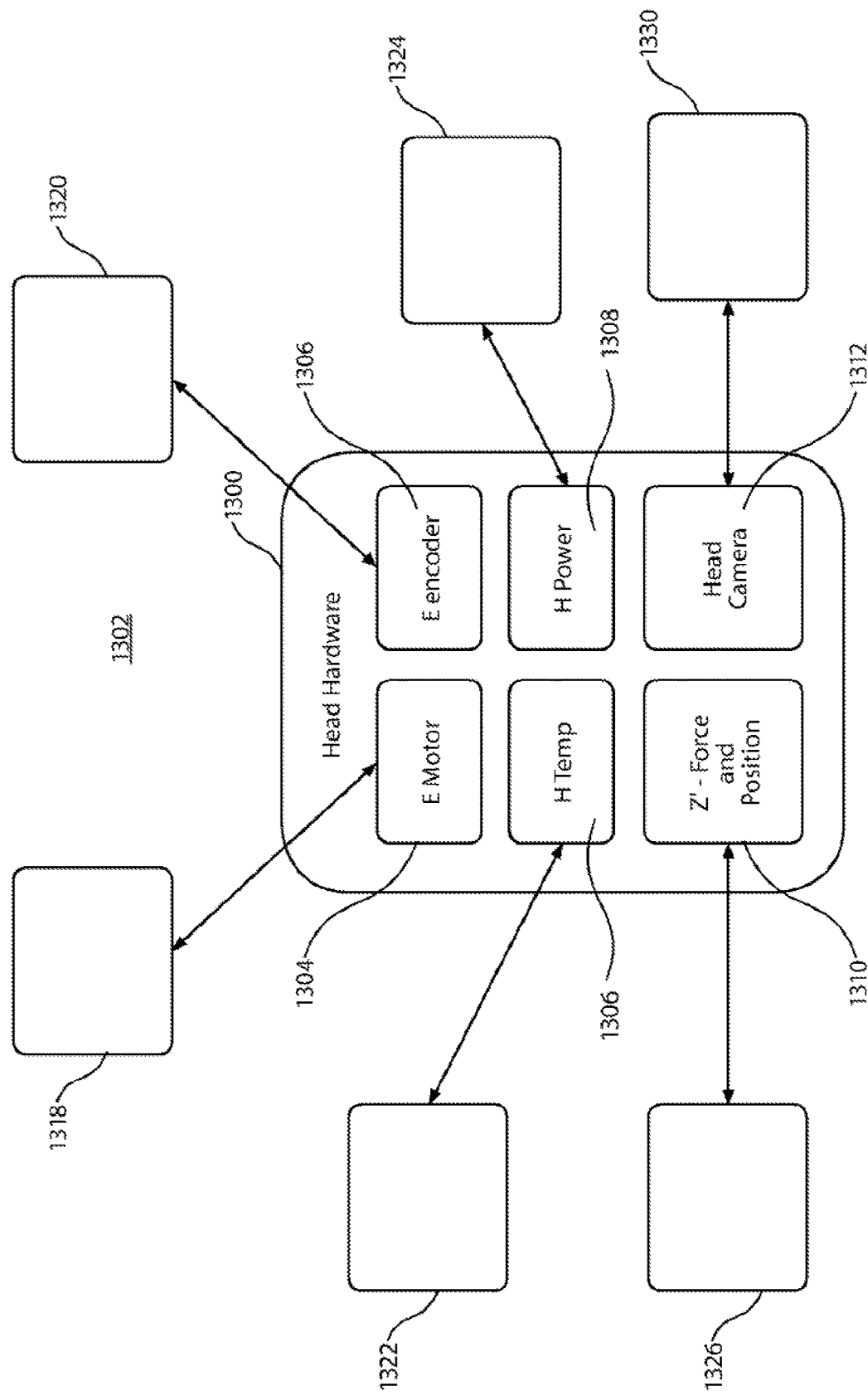
FIG. 12 illustrates an exemplary embodiment of a multi-axis additive manufacturing embodiment.

FIG. 12 illustrates an exemplary control system 1302 such as may be explicitly associated with the hardware disclosed herein. For example, the hardware characteristics 1300 may provide the various sensed feedback indicated, such as, by way of example, the motor and encoder characteristics of the E Axis 1304, 1306, the temperature and power characteristics of the H Axis 1306, 1308, the build characteristics of the print output 1310, and any secondary sensors 1312 associated with the hardware, such as a camera 1312 associated with the print head.

The control system may then associate variables with each of the foregoing sensed hardware elements, such as: the extruder force versus unit time and/or the extrusion amount or rate versus unit time in association with the E Axis 1318, 1320; the nozzle temperature versus power, extrusion rate, and/or unit time 1322; the power consumption versus temperature and unit time of the H Axis 1324; the build leveling and extrusion amount and forces versus unit time 1326; and the trace width and quality 1330, by way of non-limiting example.

Figure 13:
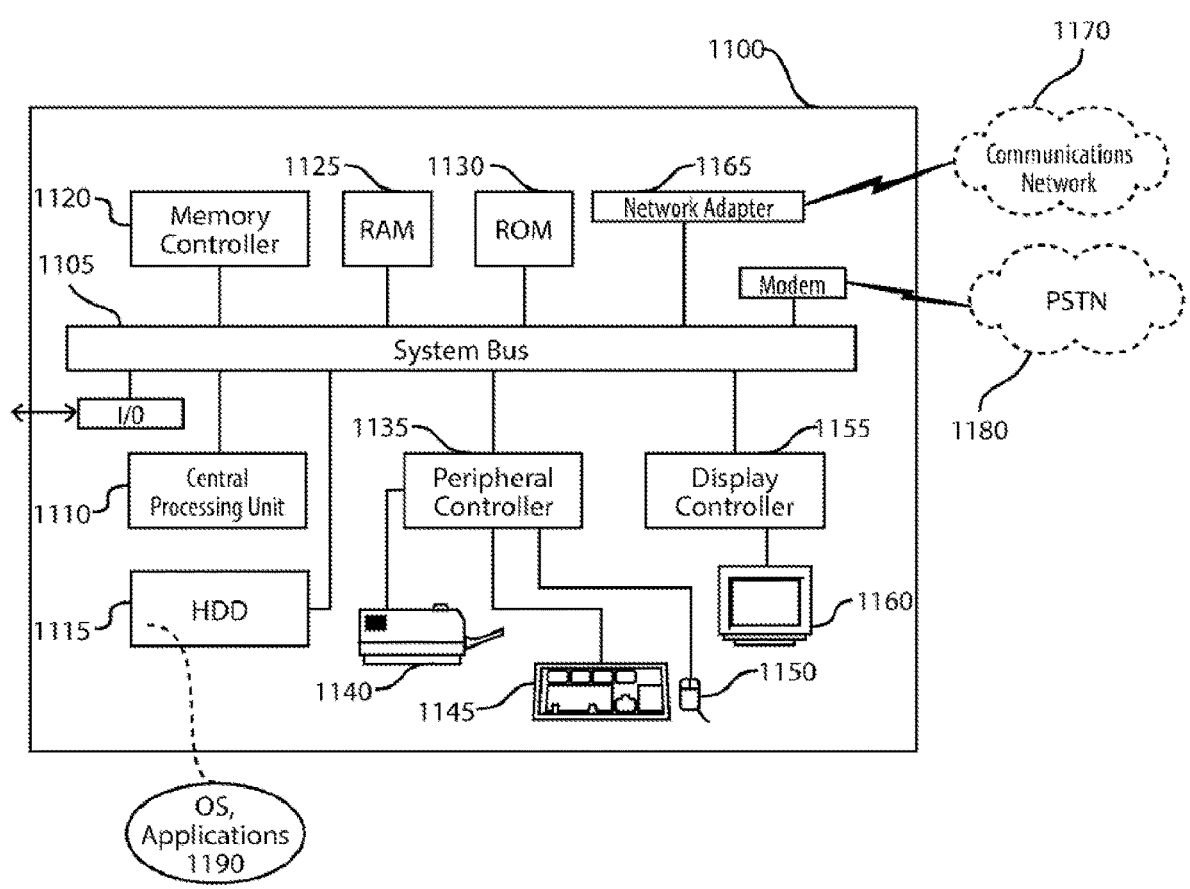
FIG. 13 illustrates an exemplary computing system.

FIG. 13 depicts an exemplary computing system 1100 for use in association with the herein described control systems and methods. Computing system 1100 is capable of executing software, such as an operating system (OS) and/or one or more computing applications 1190, such as applications applying the control algorithms discussed herein, and may execute such applications using data, such as sensor data, gained via the I/O port.

By way of non-limiting example, an exemplary algorithm applied by a control application embedded in or otherwise associated with controller 310 and receiving data from sensors 320 may be as follows:

IF Torque motor (TQm) as a function [of, e.g., Nozzle temperature, TN, material type, etc.] exceeds preset X for more than time tX, throw a flag; OR IF RATIO of Force on nozzle (FN) to TQm as a function exceeds X for more than T time:
- throw a flag; or
- increase TN; or
- decrease extrusion velocity, Vextr.

The operation of exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software such as an operating system (OS), executable programs, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 135, which is responsible for communicating instructions from CPU 1110 to, and/or receiving data from, peripherals, such as peripherals 1140, 1145, and 1150, which may include printers, keyboards, and/or the sensors discussed herein throughout. An example of a peripheral bus is the Peripheral Component Interconnect (PCI) bus.

Display 1160, which is controlled by display controller 1155, may be used to display visual output and/or presentation generated by or at the request of computing system 1100, responsive to operation of the aforementioned computing program. Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the inventive concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A method of controlling an additive manufacturing print process on an additive manufacturing printer, comprising:

monitoring, via a plurality of sensors, at least one of:
an input of print filament to a print head of the printer; and
a temperature of a nozzle of the printer,
as indicative of a current state of the additive manufacturing print process;

receiving, at at least one controller, sensor data regarding the monitoring from the plurality of sensors;

comparing the current state to a correct state of the print process by comparing the sensor data to a database of stored correct states of the print process;

assessing a crimping of the print filament as compared to the correct state of the print filament; and modifying at least one output from the at least one controller to revise the compliance of the print filament to the correct state without halting the print process.

2. The method of claim 1, wherein the correct state is the current state, and wherein the modifying comprises a zero adjustment of the output.

3. The method of claim 1, wherein the correct state is a future state based on a current one of the output according to a projection of the current one of the output.

4. The method of claim 1, wherein the correct state includes one or more tolerances for the additive manufacturing print process.

5. The method of claim 4, wherein the one or more tolerances comprise at least one of a melt temperature, a filament velocity, and a trace size.

* * * * *